US010997166B2

(12) United States Patent
Moore et al.

(10) Patent No.: US 10,997,166 B2
(45) Date of Patent: *May 4, 2021

(54) COMPARISON AND VISUALIZATION SYSTEM

(71) Applicant: eBay Inc., San Jose, CA (US)

(72) Inventors: Andrew Philip Moore, San Jose, CA (US); Yu-Hsuan Wang, San Jose, CA (US); Raymond Jeczen Pittman, San Francisco, CA (US); Michael George Lenahan, Moraga, CA (US); Ben Lucas Mitchell, Oakland, CA (US); David Louis Lippman, San Francisco, CA (US)

(73) Assignee: eBay Inc., San Jose, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/235,841

(22) Filed: Dec. 28, 2018

(65) Prior Publication Data

US 2019/0138521 A1     May 9, 2019

Related U.S. Application Data

(63) Continuation of application No. 14/886,816, filed on Oct. 19, 2015, now Pat. No. 10,204,136.

(51) Int. Cl.
*G06F 3/0482*     (2013.01)
*G06F 16/26*     (2019.01)
(Continued)

(52) U.S. Cl.
CPC ........ *G06F 16/2428* (2019.01); *G06F 3/0482* (2013.01); *G06F 3/04842* (2013.01);
(Continued)

(58) Field of Classification Search
CPC .... G06F 16/2428; G06F 16/26; G06F 16/248; G06F 3/04842; G06F 3/04847; G06F 3/0482
(Continued)

(56) References Cited

U.S. PATENT DOCUMENTS

| 10,204,136 | B2 | 2/2019 | Moore et al. |
| 2003/0065805 | A1 | 4/2003 | Barnes, Jr. |

(Continued)

OTHER PUBLICATIONS

Applicant-Initiated Interview Summary received for U.S. Appl. No. 14/866,816, dated Sep. 7, 2018, 3 pages.
(Continued)

*Primary Examiner* — Robert W Beausoliel, Jr.
*Assistant Examiner* — Pedro J Santos
(74) *Attorney, Agent, or Firm* — FIG. 1 Patents

(57) ABSTRACT

A system and method for structuring search results for attribute comparison are presented. A product selection from a user device is received. The product selection has a plurality of attributes associated with it. A plurality of adjustable sliders configured to allow the user to refine a search is generated and caused to be displayed in a user interface of the user device. One or more adjustments of the plurality of adjustable sliders is received. In response to the user to an adjustment made to a first adjustable slider of the plurality of adjustable sliders, an analysis of a networked database for search results that match values indicated by the plurality of adjustable sliders including the adjustment made to the first adjustable slider is performed. The search results are caused to be presented on the user interface displayed on the user device.

20 Claims, 12 Drawing Sheets

(51) Int. Cl.
*G06F 16/248* (2019.01)
*G06F 16/242* (2019.01)
*G06F 3/0484* (2013.01)

(52) U.S. Cl.
CPC ........ *G06F 3/04847* (2013.01); *G06F 16/248* (2019.01); *G06F 16/26* (2019.01)

(58) Field of Classification Search
USPC ... 707/E17.014, 706, E17.108, 769, E17.03, 707/722
See application file for complete search history.

(56) References Cited

U.S. PATENT DOCUMENTS

| | | |
|---|---|---|
| 2005/0171940 A1 | 8/2005 | Fogg et al. |
| 2010/0076960 A1 | 3/2010 | Sarkissian et al. |
| 2011/0015987 A1 | 1/2011 | Chakraborty et al. |
| 2012/0005045 A1 | 1/2012 | Baker |
| 2012/0226698 A1 | 9/2012 | Silvestre et al. |
| 2012/0330778 A1 | 12/2012 | Eastham |
| 2013/0311335 A1 | 11/2013 | Howard et al. |
| 2014/0067477 A1 | 3/2014 | Zhao |
| 2016/0154862 A1 | 6/2016 | Gabbai et al. |
| 2017/0109400 A1 | 4/2017 | Moore et al. |

OTHER PUBLICATIONS

Final Office Action received for U.S. Appl. No. 14/886,816, dated Aug. 16, 2018, 19 pages.
First Action Interview—Office Action Summary received for U.S. Appl. No. 14/886,816, dated Feb. 27, 2018, 5 pages.
First Action Interview—Pre Interview Communication Received for U.S. Appl. No. 14/886,816, dated Jan. 19, 2018, 5 pages.
Response to Final Office Action filed on Sep. 12, 2018, for U.S. Appl. No. 14/886,816, dated Aug. 16, 2018, 17 pages.
Response to First Action Interview—Pre Interview Communication filed on Feb. 2, 2018, for U.S. Appl. No. 14/886,816, dated Jan. 19, 2018, 3 pages.
Response to First Action Interview—Office Action Summary Filed on Apr. 27, 2018 for U.S. Appl. No. 14/886,816 dated Feb. 27, 2018, 16 pages.
Notice of Allowance received for U.S. Appl. No. 14/886,816, dated Oct. 1, 2018, 9 pages.
Gabbai, Jonathan, et al., "Mobile Optimized Shopping Comparison", U.S. Appl. No. 14/556,627, filed Dec. 1, 2014, 59 pages.

FIG. 7 ated data processing and data analysis and, more particularly, but not by way of limitation, to a comparison and visualization system utilizing dynamically changing databases.

COMPARISON AND VISUALIZATION SYSTEM

PRIORITY

This application is a continuation of and claims priority to U.S. patent application Ser. No. 14/886,816, filed on Oct. 19, 2015, which is hereby incorporated by reference herein in its entirety.

TECHNICAL FIELD

Embodiments of the present disclosure relate generally to data processing and data analysis and, more particularly, but not by way of limitation, to a comparison and visualization system utilizing dynamically changing databases.

BACKGROUND

In recent years, with the availability of search engines, users searching for particular items on the Internet are overloaded with a glut of information describing the searched items. Excessive unstructured information in search returns make it difficult for a user to have an understanding of the results and thus impair the user's decision making caused by the presence of too much information. Conventionally, search results are generated for display in a list with a plethora of information associated with each result. The structure of list results is minimal and requires users to examine each result, extract the information associated with each result in order to compare the information associated with the results. Such a structure is inefficient for processing, comparing, and contrasting information associated with the search results.

BRIEF DESCRIPTION OF THE DRAWINGS

Various ones of the appended drawings merely illustrate example embodiments of the present disclosure and should not be considered as limiting its scope.

FIG. 7 depicts an example user interface for interactively presenting the adjustable sliders and search results for comparison, according to example embodiments.

Figure 1A:
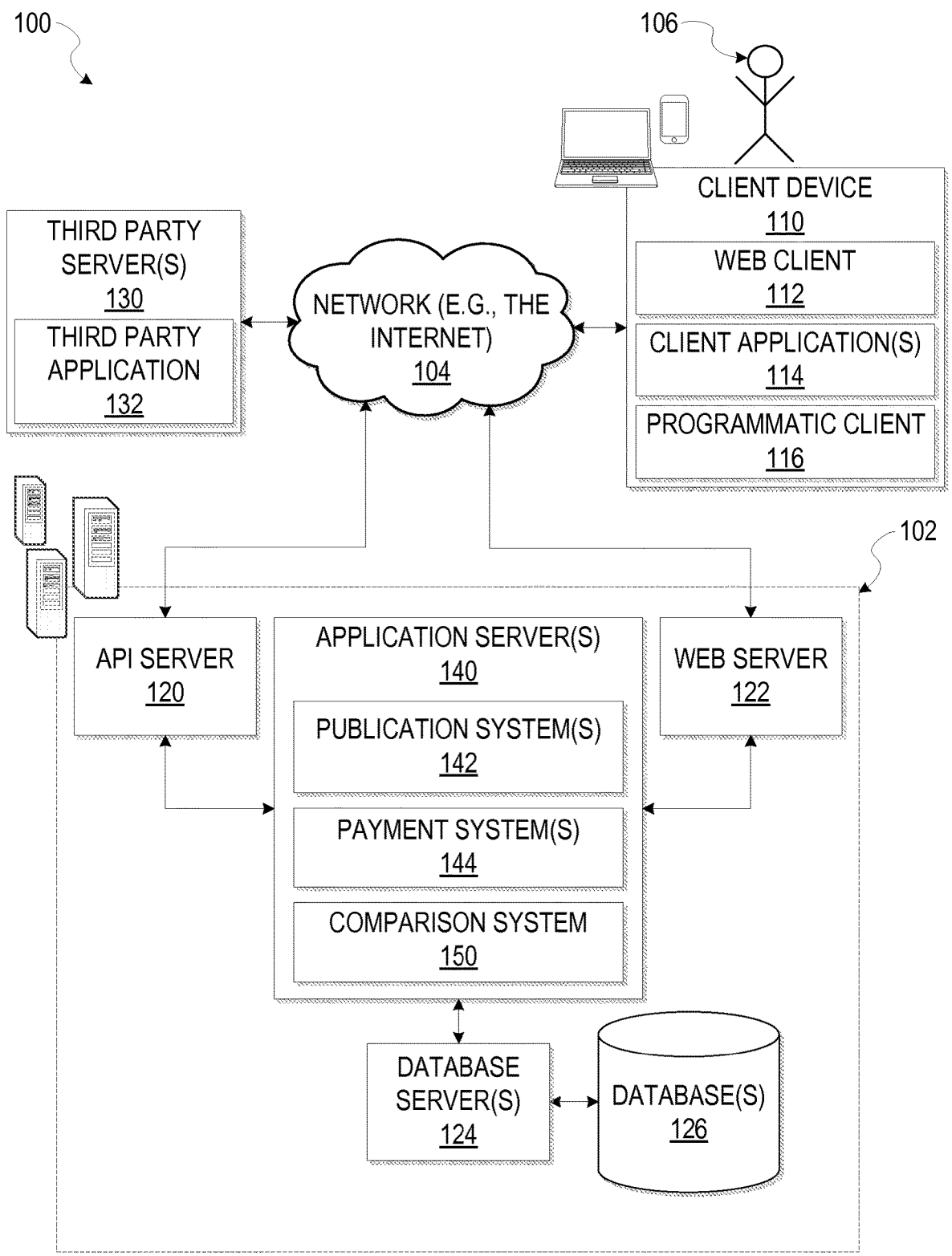
FIG. 1A is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The features of the present disclosure provide a technical solution to the technical problem of generating a structured framework for search refinement and presenting search results in order to facilitate comparison of the information presented in the search results. In various example embodiments, a comparison system provides the technical benefit of generating adjustable sliders with reference points to allow refinement of search results relative to the reference point, where the reference point reflects an attribute value of a specific product that the user desires to compare with other products.

Conventionally, search results are presented in a list format necessitating the user to read and process the information associated with each result to find the product the user desires. However, such a process fails when the amount of information exceeds the user's ability to process and juggle a large amount of unstructured information at the same time. Accordingly, a comparison system provides adjustable sliders for search refinement relative to a reference point for comparison. In various embodiments, the comparison system structures the search results in a multi-dimensional graphical format for ease of comparison to a reference point, where each dimensional axis represents an attribute the user wishes to compare across different products.

In various example embodiments, systems and methods for comparing and refining search results using an adjustable slider based on specific attribute comparison and visualization are described. The adjustable slider allows users to refine a search and compare specific attributes across different products using a dynamically changing database. Each adjustable slider also incorporates a reference point that is associated with a specific product that the user desires to compare with other products. The adjustable slider allows the user to refine a search by adjusting an adjustable knob to slide along the adjustable slider to select various attribute values. In other embodiments, the user may choose a range of attribute values using a first adjustable knob to set the initial value and a second adjustable knob to set the end value of the range. In yet other embodiments, the adjustable slider can change in appearance to reflect a change in functionality. In various example embodiments, the comparison system structures the search results in a multi-dimension graph and a list format while incorporating the reference point for user evaluation and comparison.

With reference to FIG. 1A, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1A illustrates, for example, a web client 112 (e.g., a browser, such as the Internet Explorer® browser developed by Microsoft® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1A shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

In various embodiments, the user (e.g., the user 106) comprises a person, a machine, or other means of interacting with the client device 110. In some example embodiments, the user is not be part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An Application Program Interface (API) server 120 and a web server 122 is coupled to, and provide programmatic and web interfaces respectively to, one or more application server(s) 140. The application server(s) 140 hosts one or more publication system(s) 142, payment system(s) 144, and a comparison system 150, each of which comprises one or more engines or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1A to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the comparison system 150 provides functionality to generate a structured framework for search refinement and present search results in order to facilitate the user's ability to process, compare, and contrast between the information presented in the search results. In some embodiments, the comparison system 150 communicates with the client device 110, the third party server(s) 130, the publication system(s) 142 (e.g., retrieving listings), and the payment system(s) 144 (e.g., purchasing an item in a listing). In an alternative embodiment, the comparison system 150 is a part of the publication system(s) 142. The comparison system 150 will be discussed further in connection with FIG. 2 below.

Further, while the network architecture 100 shown in FIG. 1A employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as standalone software programs, which do not necessarily have networking capabilities.

The web client 112 accesses the various systems of the networked system 102 (e.g., the publication system(s) 142) via the web interface supported by the web server 122. Similarly, the programmatic client 116 and client application(s) 114 accesses the various services and functions provided by the networked system 102 via the programmatic interface provided by the API server 120. The programmatic client 116 can, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 1B:
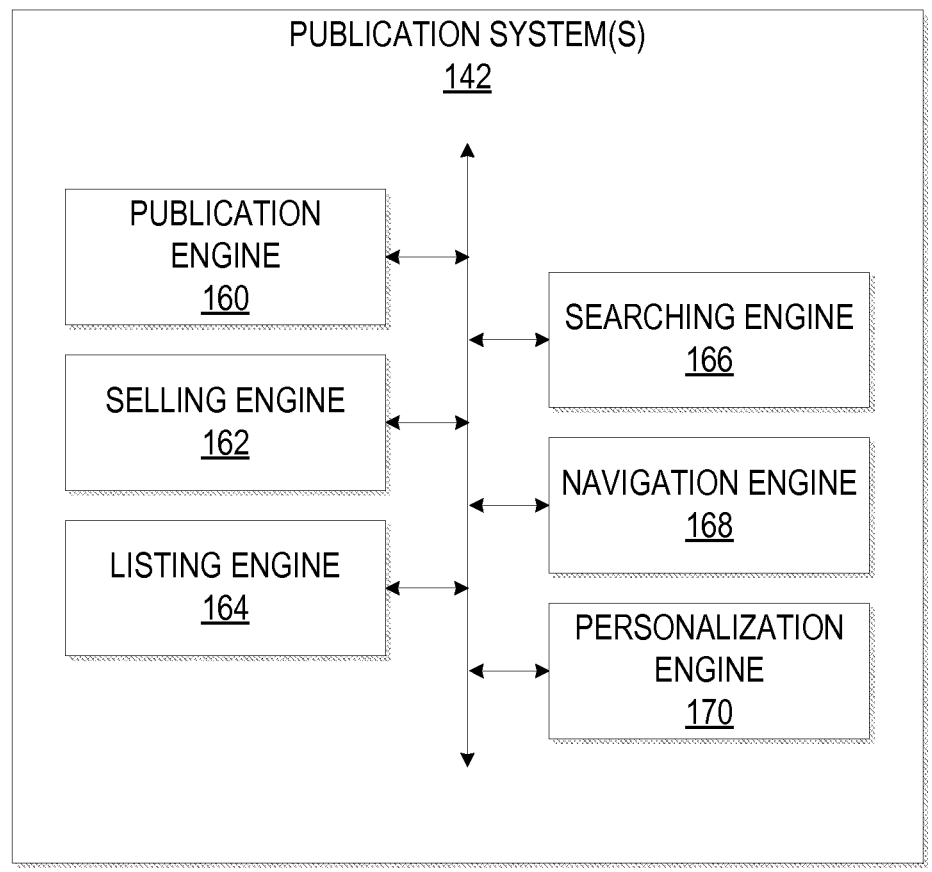
FIG. 1B illustrates a block diagram showing components provided within the publication system of FIG. 1A, according to some example embodiments.

FIG. 1B illustrates a block diagram showing components provided within the publication system(s) 142, according to some embodiments. In one embodiment, the publication system(s) 142 comprises a marketplace system to provide marketplace functionality (e.g., facilitating the purchase of items associated with item listings on an e-commerce website). In an alternative embodiment, the publication system(s) 142 comprises a search system. The publication system(s) 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124.

The publication system(s) 142 provides a number of publishing, listing, and price-setting mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services. To this end, the publication system(s) 142 comprises a publication engine 160 and a selling engine 162, according to some embodiments. The publication engine 160 publishes information, such as item listings or product description pages, on the publication system(s) 142. In some embodiments, the selling engine 162 comprises one or more fixed-price engines that support fixed-price listing and price setting mechanisms and one or more auction engines that support auction-format listing and price setting mechanisms (e.g., English, Dutch, Chinese, Double, Reverse auctions). The various auction engines can also provide a number of features in support of these auction-format listings, such as a reserve price feature whereby a seller specifies a reserve price in connection with a listing and a proxy-bidding feature whereby a bidder may invoke automated proxy bidding. The selling engine 162 can further comprise one or more deal engines that support merchant-generated offers for products and services.

A listing engine 164 allows sellers to conveniently author listings of items or authors to author publications. In one embodiment, the listings pertain to goods or services that a user (e.g., a seller) wishes to transact via the networked system 102. In some embodiments, the listings can be an offer, deal, coupon, or discount for the good or service. Each good or service is associated with a particular category. The listing engine 164 receives listing data such as title, description, and aspect name/value pairs. Furthermore, each listing for a good or service can be assigned an item identifier. In other embodiments, a user may create a listing that is an advertisement or other form of information publication. The listing information may then be stored to one or more storage devices coupled to the networked system 102 (e.g., database(s) 126). Listings also can comprise product description pages that display a product and information (e.g., product title, specifications, and reviews) associated with the product. In some embodiments, the product description page includes an aggregation of item listings that correspond to the product described on the product description page.

The listing engine 164 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 164 receives as much or as little listing data, such as title, description, and aspect name/value pairs, that the buyer is aware of about the requested item. In some embodiments, the listing engine 164 parses the buyer's submitted item information and completes incomplete portions of the listing. For example, if the buyer provides a brief description of a requested item, the listing engine 164 parses the description, extract key terms, and use those terms to make a determination of the identity of the item. Using the determined item identity, the listing engine 164 retrieves additional item details for inclusion in the buyer item request. In some embodiments, the listing engine 164 assigns an item identifier to each listing for a good or service.

Searching the publication system(s) 142 is facilitated by a searching engine 166. For example, the searching engine 166 enables keyword queries of listings published via the publication system(s) 142. In example embodiments, the searching engine 166 receives the keyword queries from a device of a user and conducts a review of the storage device storing the listing information. The review enables compilation of a result set of listings that can be sorted and returned to the client device 110 of the user. The searching engine 166 can record the query (e.g., keywords) and any subsequent user actions and behaviors (e.g., navigations, selections, or click-throughs).

The searching engine 166 also can perform a search based on a location of the user. A user may access the searching engine 166 via a mobile device and generate a search query. Using the search query and the user's location, the searching engine 166 returns relevant search results for products, services, offers, auctions, and so forth to the user. The searching engine 166 can identify relevant search results both in list form and graphically on a map. Selection of a graphical indicator on the map can provide additional details regarding the selected search result. In some embodiments, the user specifies, as part of the search query, a radius or distance from the user's current location to limit search results.

In a further example, a navigation engine 168 allows users to navigate through various categories, catalogs, or inventory data structures according to which listings may be classified within the publication system(s) 142. For example, the navigation engine 168 allows a user to successively navigate down a category tree comprising a hierarchy of categories (e.g., the category tree structure) until a particular set of listings is reached. Various other navigation applications within the navigation engine 168 can be provided to supplement the searching and browsing applications. The navigation engine 168 can record the various user actions (e.g., clicks) performed by the user in order to navigate down the category tree.

In some embodiments, a personalization engine 170 provides functionality to personalize various aspects of user interactions with the networked system 102. For instance, the user can define, provide, or otherwise communicate personalization settings used by the personalization engine 170 to determine interactions with the publication system(s) 142. In further example embodiments, the personalization engine 170 determines personalization settings automatically and personalizes interactions based on the automatically determined settings. For example, the personalization engine 170 determines a native language of the user and automatically presents information in the native language. In yet further embodiments, the personalization engine 170 stores (and access) information regarding products that the user owns (either purchased using the publication system, information that the user has entered, or information automatically detected by the comparison system 150). The information regarding the products that the user owns can be accessed can used by the comparison system 150 as reference points for comparison.

Figure 2:
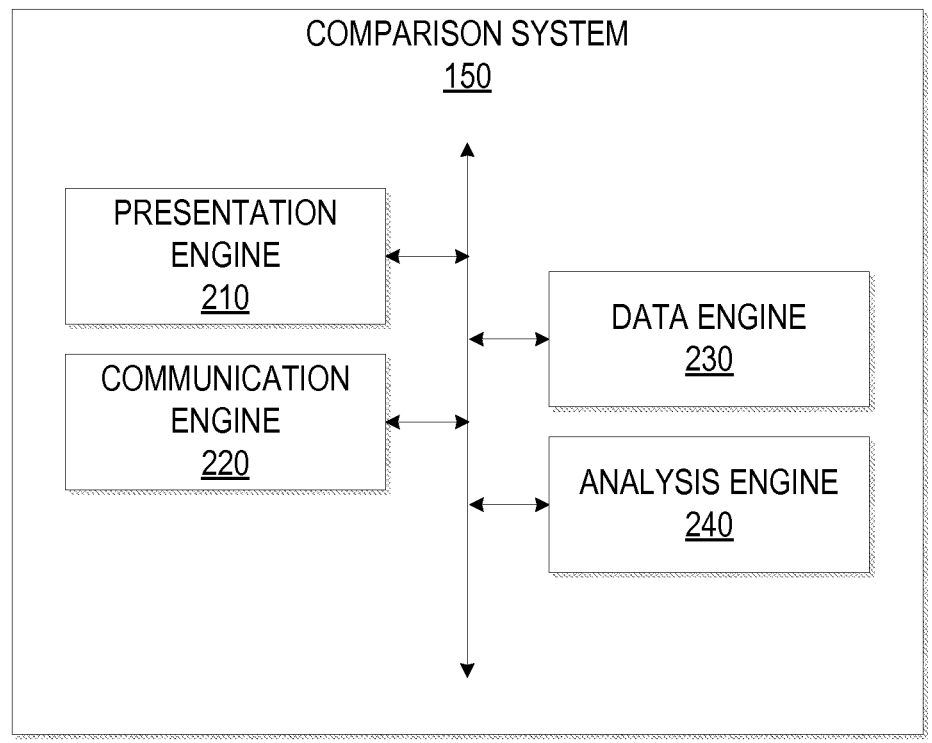
FIG. 2 is a block diagram illustrating an example embodiment of a comparison system, according to some example embodiments.

FIG. 2 is a block diagram illustrating components provided within the comparison system 150, according to some example embodiments. In an example embodiment, the system 150 includes a presentation engine 210, a communication engine 220, a data engine 230, and an analysis engine 240. All, or some, of the engines 210-240 of FIG. 2 are configured to communicate with each other, for example, via a network coupling, shared memory, bus, and the like. It will be appreciated that each engine of engines 210-240 can be implemented as a single engine, combined into other engines, or further subdivided into multiple engines. Any one or more of the engines described herein may be implemented using hardware (e.g., a processor of a machine) or a combination of hardware and software. Other engines not pertinent to example embodiments can also be included in the comparison system 150, but are not shown.

In some implementations, the presentation engine 210 provides various presentation and user interface functionality operable to interactively present and receive information from the user. For instance, the presentation engine 210 causes presentation of various notifications or user interfaces that provide the user an option to compare specific products of interest. In some embodiments, the presentation engine 210 provides a user interface with functionality for the user to choose any benchmark product as a reference point for attribute comparison and visualization.

In example embodiments, the presentation engine 210 presents adjustable sliders with multiple settings selectable by the user. In various embodiments, each adjustable slider includes a benchmark value that is associated with an attribute of a specific item (the specific item being a reference item a user desires to compare with other items). Each adjustable slider provides users the ability to slide along the scale to adjust a weight or value of an attribute. The adjustable slider is further discussed in detail below in association with FIGS. 5-7. For example, in searching for a new phone replacement, the user may adjust the slider associated with screen size (showing available values from three inch to seven inch) to a value of four inches to indicate interest in smart phones that have a four inch screen size.

In response to the user adjusting the adjustment slider to various settings or values reflecting the specific types of attributes the user desires in a product, the presentation engine 210 presents the search results in a list format and a multiple dimensional graphical format for quick product comparison. The search results in the list format is further described in detail below in association with FIG. 7. The multiple dimensional graphical format is further described in detail below in association with FIG. 6.

In various implementations, the presentation engine 210 also presents automatically generated recommendations and notifications related to the search via the user's mobile device (e.g., smart watch, smart phone). In various implementations, the presentation engine 210 presents or causes presentation of information (e.g., visually displaying information on a screen, acoustic output, haptic feedback). Interactively presenting information is intended to include the exchange of information between a particular device and the user via a user interface. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation engine 210 provides many other user interfaces to facilitate functionality described herein. Further, it will be appreciated that "presenting" as used herein is intended to include communicating information or instructions to a particular device that is operable to perform presentation based on the communicated information or instructions.

The communication engine 220 is configured to perform various communication functions to facilitate the functionality described herein. For example, the communication engine 220 provides network communication such as communicating with the networked system 102, the client device 110, and the third party server(s) 130. In various embodiments, the network communication can operate over wired or wireless modalities. Web services are intended to include retrieving information from the third party server(s) 130, the database(s) 126, and the application server(s) 140. In some implementations, information retrieved by the communication engine 220 comprises data associated with the user (e.g., user profile information from an online account, social network service data associated with the user), data associated with one or more items listed on the publication system 142 (e.g., images of the item, reviews of the item, item price), or other data to facilitate the functionality described herein. In this way, the communication engine 220 facilitates communication between the comparison system 150, the client devices 110, and the third party servers 130 via the network 104.

The data engine 230 is configured to provide various data functionality such as exchanging information with databases or servers. For example, the data engine 230 extracts product attributes for a user's device. In an example, a user may desire to search for a new smart phone in order to replace an existing current phone. The data engine 230 can access the specific specifications of the current phone and utilize those specific specifications as a reference point for comparison with other available phones.

In various embodiments, the data engine 230 provides functionality to access historical data and current data associated with searched products from the database server 124 and database 126. The database 126 is a dynamic database that stores product attributes and is dynamically changing to update and include more or different products as they are added by different users or are sold out. In an example, product attributes for a smart phone can include screen size, battery life, camera resolution, storage capacity, cost, condition of the phone (e.g., new, refurbished, used), color, phone carriers associated with the phone, reviews, value score, or other attribute relevant in describing the product.

In some embodiments, the database 126 stores a predetermined value score associated with a product. The value score reflects an overall rating for a product utilizing several weighted factors including: user review, price, available features of the product, resale value, condition of the product (e.g., new, used, refurbished), quality value (e.g., the average time in which a product version lasts until a new version is launched thereby making the other version more obsolete), or the like. In order to calculate the value score, for each of these factors, the data engine 230 assigns points based on how well the product ranks. For instance, for the user review factor, a point is assigned for each positive user review the product has. The data engine 230 computes the value score using a weighted sum algorithm based on pre-determined weights assigned to each factor. These pre-determined weights reflect the relative importance of each factor. For example, for a smart phone, the quality value factor is determined to be more important than the resale value and therefore given more weight in determine the value score than the resale value. In some embodiments, the data engine 230 exchanges information with the third party servers 130, client device 110, and other sources of information.

The analysis engine 240 provides functionality to analyze the attributes stored within the dynamically changing database 126 to provide attribute comparison and refinement of search results. The user can choose any benchmark product (e.g., a product that the user desires to use as a reference point for further comparison with other products). The benchmark product can be chosen as the reference point in several ways, including: by the user entering in the information, the user choosing a product from a search result list, the user choosing a product from the user's purchase history, or the analysis engine 240 automatically accessing and retrieving product information directly from the user's device. Each of these options is fully described in detail below.

In an example, a user may desire to search for android phones to replace a smart phone that the user is using. In example embodiments, the user can enter in attributes associated with a product as a reference point for search and comparison with other products. For instance, the user can enter in the specifications of the user's smart phone that he wishes to replace. In a specific example, the entered attributes can include screen size, battery life, camera resolution, storage capacity, condition of the phone (e.g., new, refurbished, used), color, phone carriers associated with the phone, or other attributes relevant in describing the smart phone. Alternatively, the user may enter a search query for android phones. From the search results, the user may choose a specific android phone and use it as a reference point for further search refinement and further comparison and evaluation.

In example embodiments, in response to the user searching for a product (e.g., searching for android phones in reference to the specific example above), the analysis engine 240 determines the search query is associated with a product the user has purchased previously from the user's purchase history. The association is based on a match between the search query and the product name or description from the user's purchase history. Further, in response to the determined association, the analysis engine 240 causes a suggestion to be presented to the user inquiring whether the user would like to use the specific product that the user has previously purchased as a reference point for comparison. For example, the suggestion can be, "Would you like to compare your current smart phone device you purchased two years ago with other smart phones?" In response to the user selecting to use the suggestion or any other selection from the user's purchase history, the analysis engine 240 extracts or determines the attributes associated with the product selected by the user from the user's purchase history stored in the database 126. For instance, the user's profile information includes past purchases that the user has made and may wish to compare with other products available to determine if updated products are available.

In various example embodiments, the analysis engine 240 automatically accesses and retrieves product information the user owns directly from the user's device, and use the product information as a reference point. The analysis engine 240 may automatically detect the devices that the user is using, extracts the attributes associated with the device, and uses the attributes as a reference point. For instance, where the user is using a smart phone to search for other smart phones in the market, the analysis engine 240 automatically accesses the smart phone's technical specification and extracts that information for use as a reference point for further comparison. The technical specification of the smart phone is stored in the hard drive of the smart phone and accessible by the analysis engine 240. In example embodiments, the analysis engine 240 subsequently provides a suggestion to the user to use the current device as a reference point.

In example embodiments, after the attributes of the product being used as a reference point is obtained, the analysis engine 240 can generate a plurality of adjustable sliders, each adjustable slider based on an attribute associated with the product. In various embodiments, a search refinement entered by a user may be in the form of selections from multiple adjustable sliders (e.g., a slider that can move along a sliding scale with various incremental value points) to choose an appropriate feature with which to refine search results. In an example, a user searching for a smart phone may select from multiple adjustable sliders (e.g., screen size, color, capacity, carrier, condition, camera, battery capacity, cost) to indicate a specific value for each attribute associated with each adjustable slider. The adjustable slider is further discussed in detail below in association with FIG. 5.

In some embodiments, the analysis engine 240 access the database 126 to determine which product possess value attributes that matches the selected values of the search refinement from the adjustable slider. In various embodiments, the analysis engine 240 structures the search results allowing the user to identify features for evaluating and comparing between different products with ease. The data structuring of the search results may comprise a list format or a multi-dimensional graph where each data point within the multi-dimensional graph represents a product. The presentation engine 210 presents the search results in the list format and the multiple dimensional graphical format for ease of attribute assessment and comparison in the presence of a plethora of products that meet the search requirements. The search results in the list format are further described in detail below in association with FIG. 7. The search results in the multi-dimensional graph format are further described in detail below in association with FIG. 6.

Figure 9:
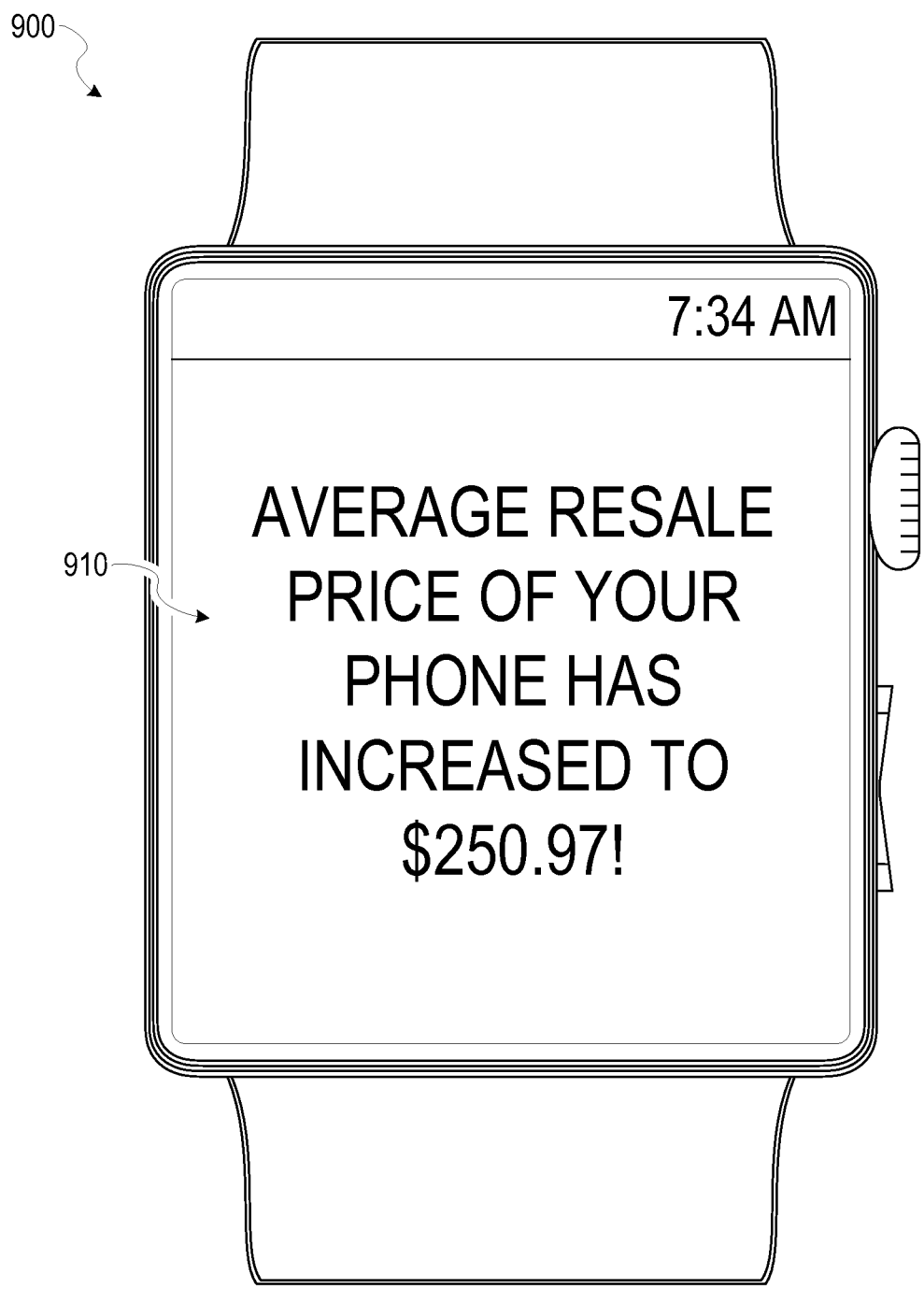
FIG. 9 depicts an example mobile device displaying an example message notification, according to example embodiments.

In various example embodiments, the analysis engine 240 generates messages in the form of SMS messages, MMS, EMS, or push notifications to a user device (e.g., smart phone or other mobile devices). During a search session, a user may select to receive notifications of relevant updates associate with a specific product. In response to the selection, the analysis engine 240 provides the notifications to the user by generating short messages with relevant updates associated with the specific product. In other embodiments, where the user uploads a current device to compare with other devices in the market, the analysis engine 240 automatically generates notifications associated with the user's current device. For instance, if the average resale price of the user's current device has recently increased, then the analysis engine 240 automatically generates a notification message and sends the message to the user as shown in FIG. 9.

In further example embodiments, the current location of the user device is determined and used to detect nearby merchants that sell the specific product the user has indicate interest (e.g., during a search session, the user select to get notifications of relevant updates associate with a specific product). The analysis engine 240 obtains geo-location information of the user's current mobile device associated with the query via a Global Positioning System (GPS) application employed by the mobile device. In response to the user indicating interests in a specific product, the analysis engine 240 analyzes the search results for products available near the user's location. The analysis engine 240 further filters the search results presented in both the graphical and list format to limit the presentation to products near the user's location. The proximity measurements being near the user's location is a predefined distance measurement. In some instances, the prices for resale of a product may differ by the location and may provide further insights for the user for further evaluation and comparison.

Figure 3:
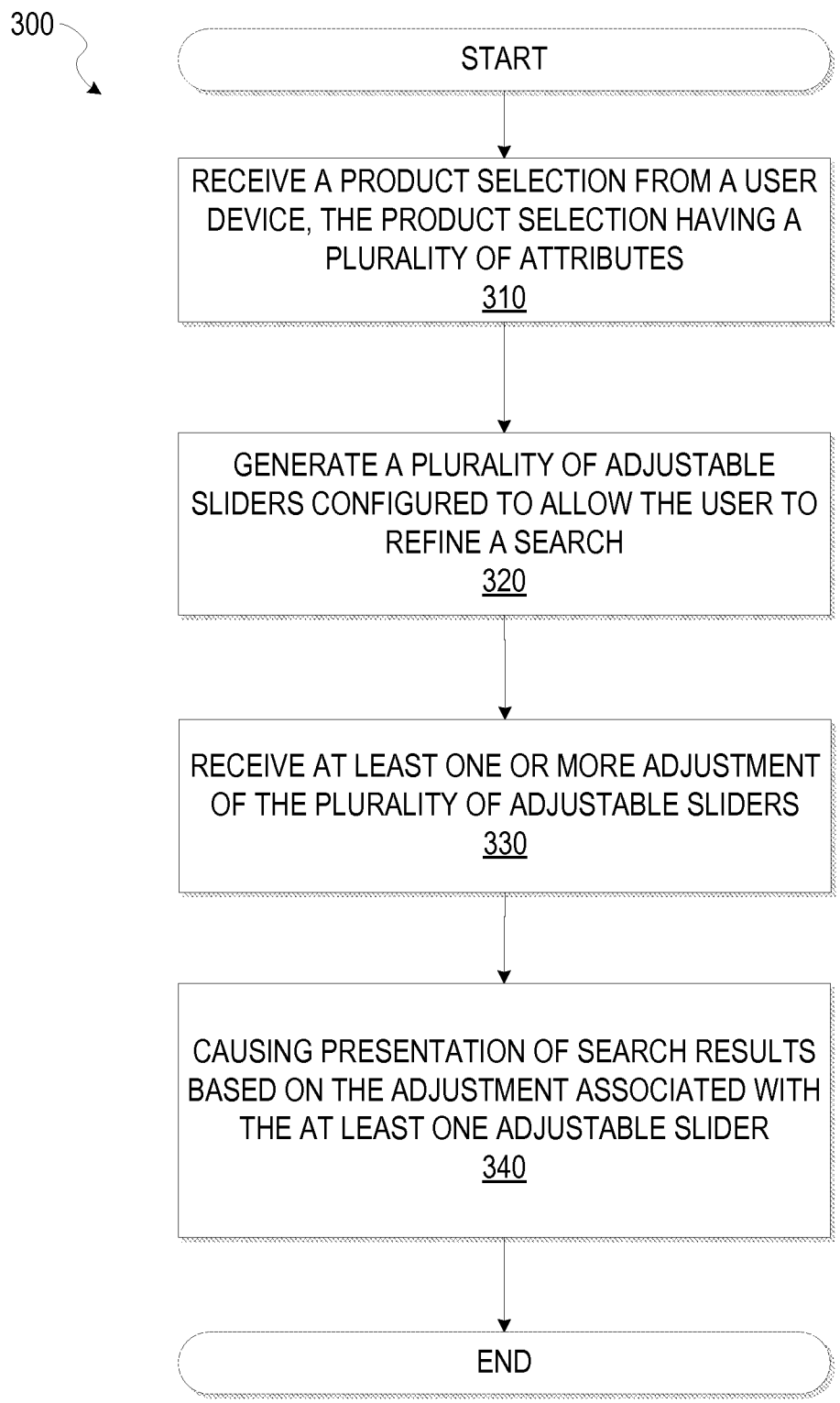
FIG. 3 is a flow diagram illustrating an example method for generating adjustable sliders configured for refinement and comparison of search results, according to some example embodiments.

FIG. 3 is a flow diagram illustrating an example method 300 for generating adjustable sliders configured to allow the user to refine a search that compares available products with the user's current product. The operations of the method 300 may be performed by components of the comparison system 150.

At operation 310, a product selection is received, via a user interface, from a user at a user device. The product selection having a plurality of attributes. As fully described above in association with FIG. 2, the product selection is subsequently used as a reference point and can be chosen in several ways. In various embodiments, the user can enter the product information manually. According to other embodiments, the user can choose a product from a search result list or from a list of the user's purchase history. In yet other example embodiments, the analysis engine 240 automatically accesses and retrieves product information directly from a device that the user owns. An example of the automatic retrieval is shown in association with FIG. 5. After the product selection is received, the analysis engine 240 extracts the attributes associated with the product for subsequent incorporation into adjustable sliders as reference points. For instance, for a smart phone, the attributes (e.g., such as screen size, battery life, camera resolution, storage capacity, cost, operating system, and the like) are extracted for subsequent incorporation into adjustable sliders as reference points.

At operation 320, the data engine 240 generates a plurality of adjustable sliders for presentation on a user interface displayed at the user device, each of the plurality of adjustable sliders configured to allow the user to refine a search. Each of the plurality of adjustable sliders incorporates one of the plurality of attributes as a reference point. As fully detailed in FIG. 5, each adjustable slider has a reference point to indicate the attribute value of the product that the user selected. In example embodiments, the product selection is a product that the user owns and desires to compare the attributes to other products available. This may be done, for example, to determine a next product to purchase. In other embodiments, the product selection is a product the user desires to purchase but wishes to do further research on to and compare and contrast with other available products in order to proceed with a decision to purchase. Having a reference point with an adjustable slider allows the user to refine the search while having a basis for evaluation, assessment, and comparison. The adjustable slider allows the user to refine a search by fine-tuning one attribute at a time. After the analysis engine 240 generates the adjustable sliders, the presentation engine 210 presents the adjustable sliders to the user via the user interface of the user device.

Figure 5:
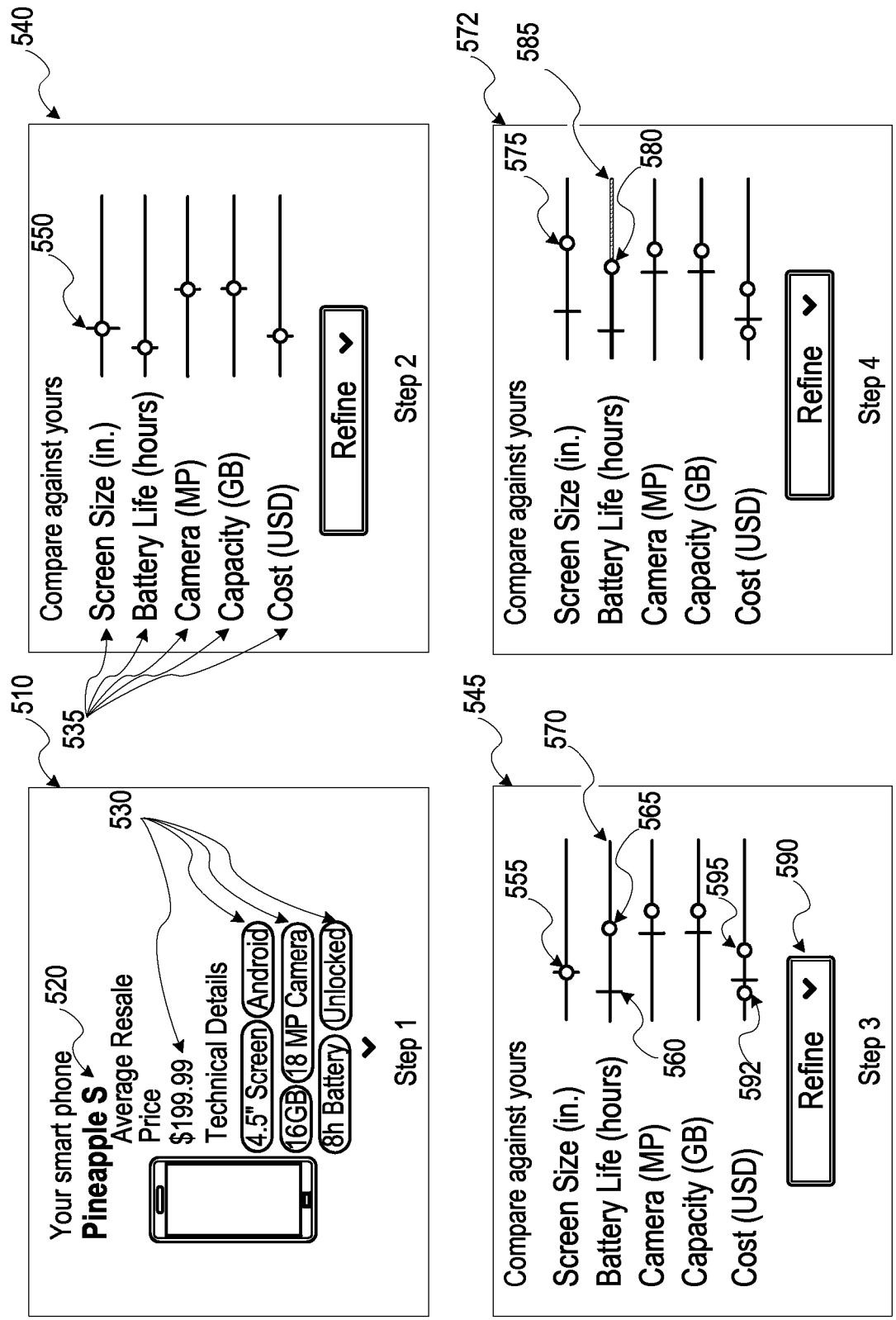
FIG. 5 is a block diagram illustrating an example of adjustable sliders used to refine a search that compares available products with the user's current product, according to example embodiments.

At operation 330, the analysis engine 240, receives one or more adjustment of the plurality of adjustable slider. Once the adjustable sliders are generated and presented to the user, the user can adjust each slider to refine a search. As illustrated in FIG. 5, a single adjustable slider associated with the screen size is shown in step 3. The user can adjust the slider using an adjustable knob 555 from the point of reference to the position in step at adjustable knob 575 position, reflecting an adjustment in the screen size search refinement from a 4.5 inch screen size at adjustable knob 555 position to a 7 inch screen size selection at adjustable knob 575 position. The user can adjust one or more adjustable slider.

At operation 340, the analysis engine 240, in response to the user adjusting at least one adjustable slider, cause presentation of search results on the user interface displayed on the user device. The search results are based on the tuned attribute associated with the at least one adjustable slider. After the user adjusts the adjustable slider, the analysis engine 240 accesses the database 126 and search for products that match the attribute values as indicated by each adjustable slider. The analysis engine 240 structures the results of the match in graphical and list formats to facilitate analysis and comparison with the selected product (e.g., where each attribute of the selected product is used as a reference point in each adjustable slider). Structuring the results of the match in a graph is further described in detail below in association with FIG. 6. Structuring the result of the match in list format is further described in detail below in association with FIG. 7.

Figure 4:
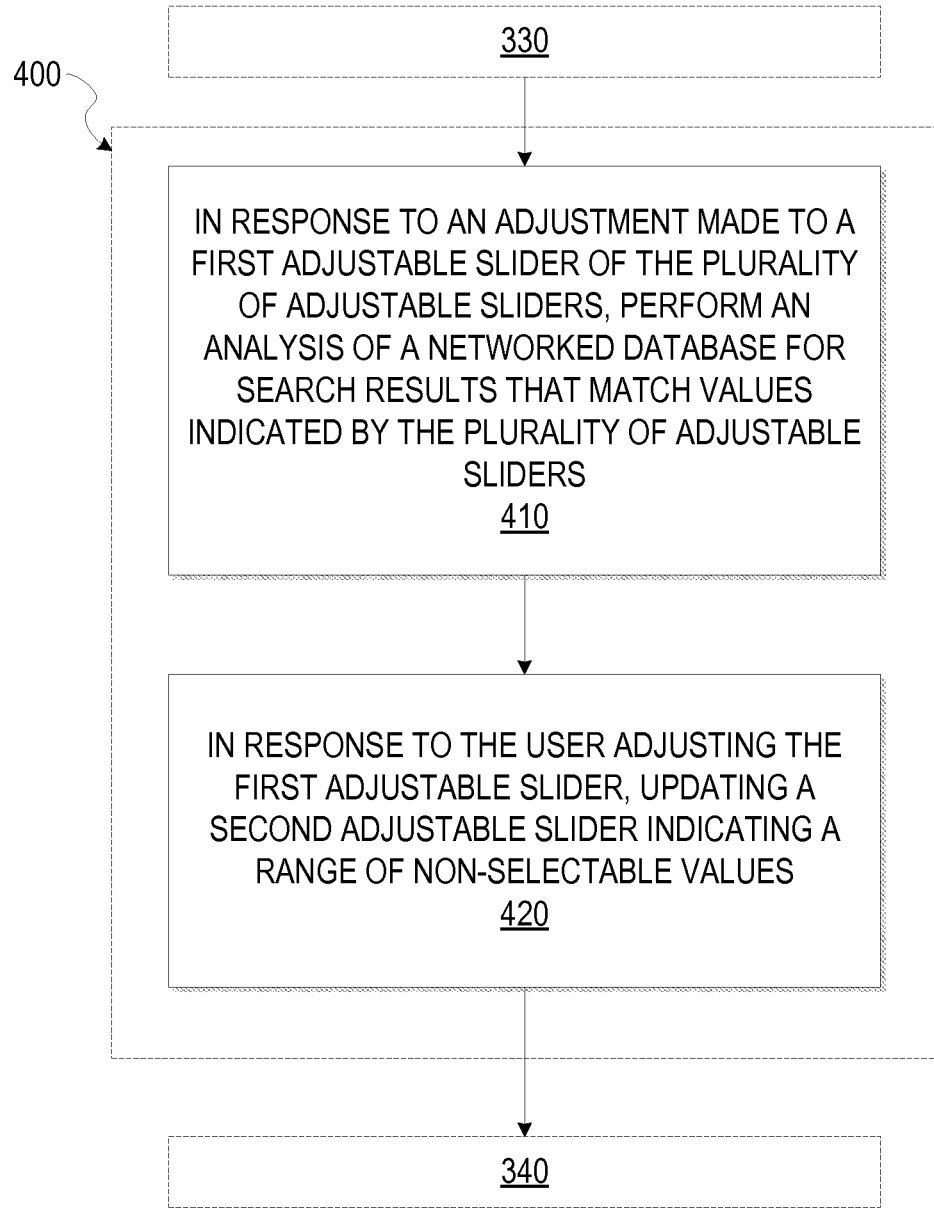
FIG. 4 is a flow diagram illustrating an example method for refining a search using adjustable sliders, according to some example embodiments.

FIG. 4 is a flow diagram illustrating an example method 400 for refining a search using adjustable sliders. The operations of the method 400 may be performed by components of the recruiting system 200.

At operation 410, in response to an adjustment made to a first adjustable slider of the plurality of adjustable sliders, the analysis engine 240 performs an analysis of a networked database for search results that match values indicated by the plurality of adjustable sliders including the adjustment made to the first adjustable slider. In an embodiment, the analysis engine 240 accesses the database 126 and search for products that match the attribute values as indicated by each adjustable slider. In other embodiments, a single adjustable slider can include two adjustable knobs to indicate a range of acceptable attribute values. Each adjustable sliders include a first selector adjusted by the user to indicate a first value of the associated attribute and a second selector adjusted by the user to indicate a second value of the associated attribute, the first value and second value indicating a range of acceptable values of the associated attribute for the search refinement. As fully described in association with Step 3, 545 and adjustable knob 592 and 595 of FIG. 5, the adjustable knobs represent the first selector and second selector, respectively. A beginning of the range is indicated by the first value that the user selects via an adjustable knob and the end of the range is indicated by the second value that the user selects also via an adjustable knob. Some attributes are better represented when using a range rather than a single value due to large variations that are currently available. For instance, the cost of a product varies greatly because different sellers can set their prices differently and therefore a range is better suited when fine-tuning a cost attribute of a search.

At operation 420, in response to the user adjusting a first adjustable slider, the analysis engine 240 updates a second adjustable slider indicating a range of non-selectable values. It is appreciated that within the comparison system 150, operations 410 and operations 420 do not need to occur every time. In one embodiment, operations 410 can be performed and not operation 420. In another embodiment, operations 420 can be performed and not operation 410. In yet another embodiment both operation 410 and operation 420 can both occur. As fully described in association with FIG. 5, Step 4, 572, in response to the user adjusting the first adjustable slider, the analysis engine 240 causes the second adjustable slider to change in appearance to reflect a change in the ability for the user to select certain values within the adjustable slider. For instance, a user adjusts values for a screen size adjustable slider (first adjustable slider) from 4.5 inches to six inches. In response to the user adjusting the screen size adjustable slider, the analysis engine 240 determines within the database 126 there are no existing products that have a six-inch screen with a batter life more than thirteen hours. As a result, the analysis engine 240 updates a battery life adjustable slider to change the functionality (e.g., the user cannot select any value more than thirteen hours). The analysis engine 240 and the presentation engine 210 also updates the visualization of the battery life adjustable slider to reflect the change in functionality such that the range of values that cannot be selected is differentiated from the range that can be selected. The visual differentiation can be in example form of a different color, texture, pattern, and the like.

FIG. 5 is a block diagram illustrating an example of adjustments made to adjustable sliders to refine a search that compares available products with the user's current product. FIG. 5 illustrates an example of search refinement using the specific example of a smart phone, however it is appreciated that the search refinement may be applied to any product (e.g., smart devices, mobile devices, computing devices, televisions, computer monitors, headphones, electronics, and the like). In Step 1, 510, the analysis engine 240 automatically accesses the user's smart phone technical specification and extracts information used as a reference point for further comparison. The technical specification that is accessed and retrieved can include a smart phone version 520 along with other details shown in a technical details section 530 including, but not limited to, operating system platform, factory unlocked, batter life, screen size, storage capacity, camera resolution, and the like.

In step 2, 540, the analysis engine 240 generates a plurality of adjustable sliders, where each adjustable slider represents an associated attribute 535. The attributes 535 are determined based on the technical details 530, extracted in step 1. Each of the attributes 535 has an adjustable slider where each of the attributes 535 are measured in a unit measurement appropriate for the attribute. For instance, the screen size is measured in inches (in.), battery life is measured in hours (h), camera resolution is measure in megapixels (MP), storage capacity is measured in gigabytes (GB), and cost is measure in United States Dollars (USD). Each adjustable slider has a reference point such as 550 that reflects a measurement of the user's device extracted in Step 1. The reference point can be from any product the user desires to be used as the reference point for further comparison. The adjustable slider has an adjustable knob such as adjustable knob 555, 565, 592, and 595. The adjustable knob initially is presented to the user as having the values associated with the reference point as shown in Step 2, 540, where the reference point reflects the attributes extracted from the technical details 530 in Step 1.

In Step 3, 545, the user can adjust, for example, the adjustable knob 565 away from the battery life reference point 560 to indicate that the user desires to search for other smart phones with a battery life that is longer than the battery life of the reference point 560. Further, the user can select refine button 590 for more options such as changing the adjustable knobs from a single knob to a dual knob that allows for a range of acceptable values such as the adjustable knobs 592 and 595. Adjusting the adjustable knob 592 and 595 indicates that any value of cost within the range of cost between the values selected at knob 592 and 595 is acceptable. Each adjustable slider can have the dual knobs to indicate a range of acceptable attribute value in the search results.

Further, the adjustable slider can change in appearance to indicate that certain values on the slider are not options that are selectable by the user. The non-selectable values reflect an unavailability of the any products in the database 126 that currently possess the attributes within the non-selectable values. For instance, the user can adjust the adjustable knob 555 from the position as shown in Step 3, at the reference point to the position of the adjustable knob 575 as shown in Step 4, indicating that the user wishes the screen size to be at a value larger than the reference point. In response to the adjustment of the adjustable knob from position 555 to position 575, the analysis engine 240 determines that there are no other smart phones having the selected screen size value, camera megapixel value, storage capacity value, and cost range that also has a battery life longer than the range of values indicated by the adjustable knob 580 to battery life value 585. Based on that determination, the analysis engine 240 causes the battery life range from knob 580 to battery life value 585 to be non-selectable by the user. The analysis engine 240 in combination with the presentation engine 210 also changes the non-selectable range of battery life values on the adjustable slider to a different color or pattern from the rest of the slider that is selectable to indicate a visual difference. The visual difference reflects the functional difference in the ranges of the adjustable slider in the ability for the user to select of those values. In various embodiments, as the slider is adjusted to the desired value, the search results automatically change without additional steps from the user.

Figure 6:
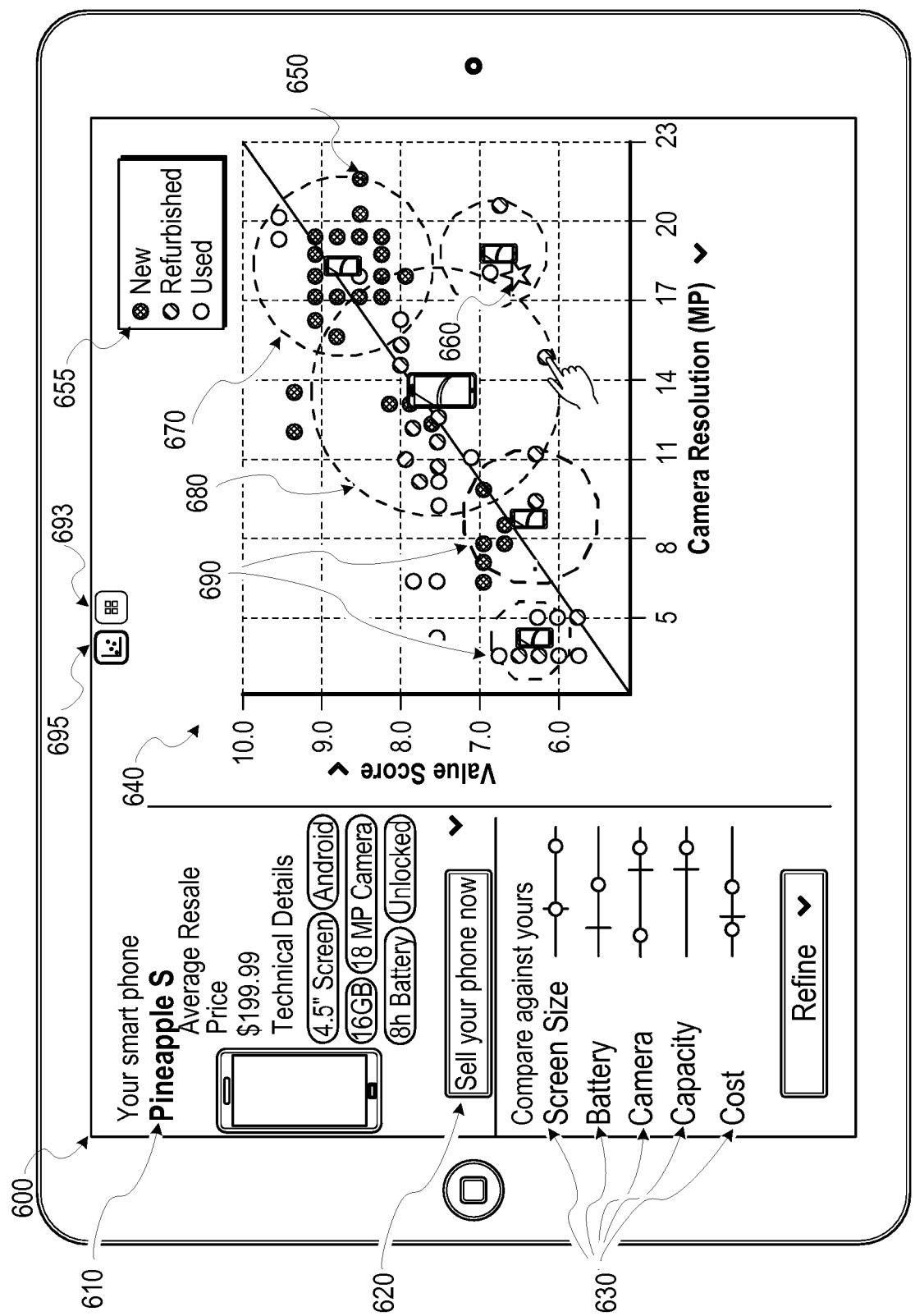
FIG. 6 depicts an example user interface for interactively presenting the adjustable sliders and search results for comparison, according to example embodiments.

FIG. 6 illustrates an example user interface 600 for interactively presenting the search refinement adjustable sliders to the user for evaluation and comparison against a specific device and for presenting the search results in a structured graphical format for comparison of the specific device with all search results. The user's smart phone version 610 along with technical details are automatically accessed by the analysis engine 240 as described in association with Step 1, 510. The technical details of the user's smart phone are extracted and the attributes are used as reference points for each adjustable slider 630. The adjustable sliders 630 are generated by the analysis engine 240 and adjustable by the user as described in detail in association with Step 2, 540, Step 3, 545, and Step 4, 572 of FIG. 5 above. Although FIG. 6 shows an example of a smart phone comparison, it is appreciated that the comparison system can be used for any set of products that have common attributes with other similar products of a similar or different category.

At any time during the search refinement and comparison, the user may opt to sell their current smart phone by selecting selection 620. The smart phone has a predicted average resale price based on what other similar smart phones (e.g., other phones having similar technical details) have sold for in the past. The user clicking on the selection 620 results in the analysis engine 240 automatically generating a post placing the user's current smart phone for sale on an ecommerce platform, such as eBay. The post comprises the technical details along with a sale price that is the predicted averaged resale price. The user has the option of editing any information presented in the post before placing the smart phone for sale.

In response to the user adjusting the adjustable sliders 630, the analysis engine 240 structures the information from the search result in a multi-dimensional graph 640 for user comparison and visualization. Each of the attributes associated with the adjustable slider 630 can be represented as axis in the graph 640. In this specific example, the y-axis represents the value score of each product. As previously discussed, the value score reflects an expert review of the product utilizing several weighted factors including: user review, price, available features of the product, resale value, condition of the product (e.g., new, used, refurbished), quality value (e.g., the average time in which a product version lasts until a new version is launched thereby making the other version more obsolete), and the like. In this specific example, the x-axis represents the camera resolution range selected by the user using the adjustable slider 630.

Each data point (data point 650 as one example) of the graph 640 reflects a search result that fits within the requirements of the search refinement as controlled by the adjustable sliders 630. In this specific example, each data point (data point 650 as one example) represents a smart phone that fits the criteria as specified in the adjustable sliders 630. In one embodiment, each data point reflects a product available for sale and stored in the dynamic database 126. Due to the dynamic nature of the database 126 and the availability of products, the search results may differ every time the user refines the search. Although in this specific example the graph 640 depicts a two-dimensional graph, it is appreciated that the analysis engine 240 can structure the data in a multi-dimensional graph (e.g., three dimensions), where the third dimension can be any of the attributes from the adjustable sliders 630 (e.g., screen size, battery life, hard drive capacity, cost, and the like). Each data point can also differ by the condition 655 (e.g., new, refurbished, or used) of the smart phone. Just as the adjustable sliders 630 include a reference point reflecting the attributes of the user's smart phone, the graph 640 also includes a reference point 660 as a point of comparison to other smart phones. The reference point 660 indicates the user's smart phone.

The analysis engine 240 can further structure the search result data by grouping the data points into specific groups 670-690, where each specific group represents a specific type of smart phone. Each specific group represents a particular type of product and selecting the group will bring up all available products within that type. For example, all the data points within the specific group 670 represents the specific smart phone type Android 4.4 Mars, the specific group 680 represents the specific smart phone type Android 4 Luna, and the specific group 690 represents yet another specific smart phone type Android 3 Sol. Each of the specific groups 670-690 is selectable by the user to further refine the search and cause graph generation to include the products represented by each of the data points within the selected specific group. For example, in response to the user selecting group 670, the graph 640 is updated by the analysis engine 240 to restructure the data in a multi-dimensional graph format to show only the data points within the specific group 670. Each time the analysis engine 240 updates the graph, the reference point 660 is still presented in the updated graph as a reference point. Optionally, in response to the user selecting specific group 670, the adjustable slider values are also updated to closer reflect the values of the specific group 670. Further, each data point (e.g., data point 650) represents an available product and selecting the data point surfaces the specific details associated with the product. For example, in response to the user selecting data point 650, the analysis engine 240 will restructure the presented information to present all available smart phone with 22 MP camera resolution and an 8.5 value score with the values as indicated in the adjustable sliders 630. Additionally, the user may wish to change the structure of the data by selecting a list format selector 693. The user can toggle between the graph structure using a graph structure selector 695 or a list format using the list format selector 693 for different ways to compare the user's smart phone with the search results.

Figure 7:
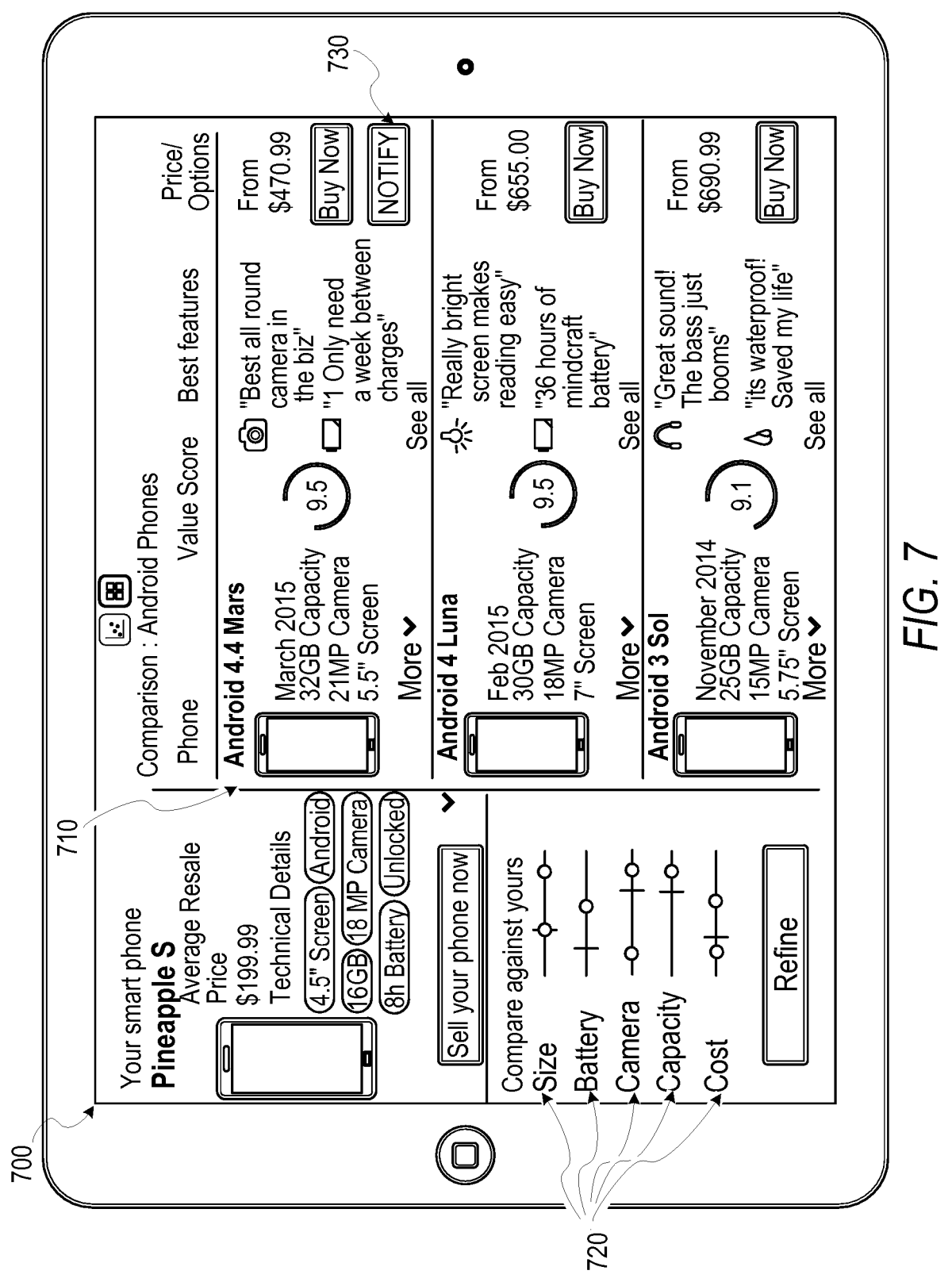

FIG. 7 illustrates an example user interface 700 for interactively presenting the search refinement adjustable sliders for the user to compare against a specific device and for presenting the search results in a structured list format for comparison of the specific device with the search results. In various embodiments, in response to the user selecting the list format selector 693, the analysis engine 240 presents the search results in a list format 710. The list format 710 is sorted by column such as value score, best feature, and price. Alternatively, the user can choose to sort using the attribute values of the adjustable slider 720. For each specific product, the user can choose selection 730 which provides notification of relevant updates associated with the specific product or when more products with the same specification become available. The notification selection 730 can be associated with one type of product such as selection 730, or it could be more general such as a specific group such as specific group 670-690.

In various embodiments, the analysis engine 240 structures the information in the multi-dimensional graph to include a trend associated with a product. The trend include the demand and inventory for a specific type of product or a category of product. For instance, a specific type of product include the Android 4 Luna whereas a category of product can include all Android smart phones. To determine the trend, the analysis engine 240 accesses product databases to determine the demand and inventory of a product. The demand is identified as the amount of the product that people are ready to purchase at a given time and determined based on the number of query searches associated with the product. In an embodiment, the demand can be structured in a multi-dimensional graph including the demand at various times. For instance, in response to the user selecting to view the demand trend of a product, the analysis engine 240 generates a graph where the x-axis represents the time (the time unit can include days, weeks, months, or years) and the y-axis represents the demand trend of the product. The graph can include the past historical demand trend and a prediction of the future trend based on the historical trend. Prediction algorithm can be determined by the analysis engine 240 using prediction models including Naïve Bayes, logistic regression, linear models, and the like. Further, the graph can also include an inventory trend along the z-axis showing the number of items available for sale at any point along the time axis.

Figure 8:
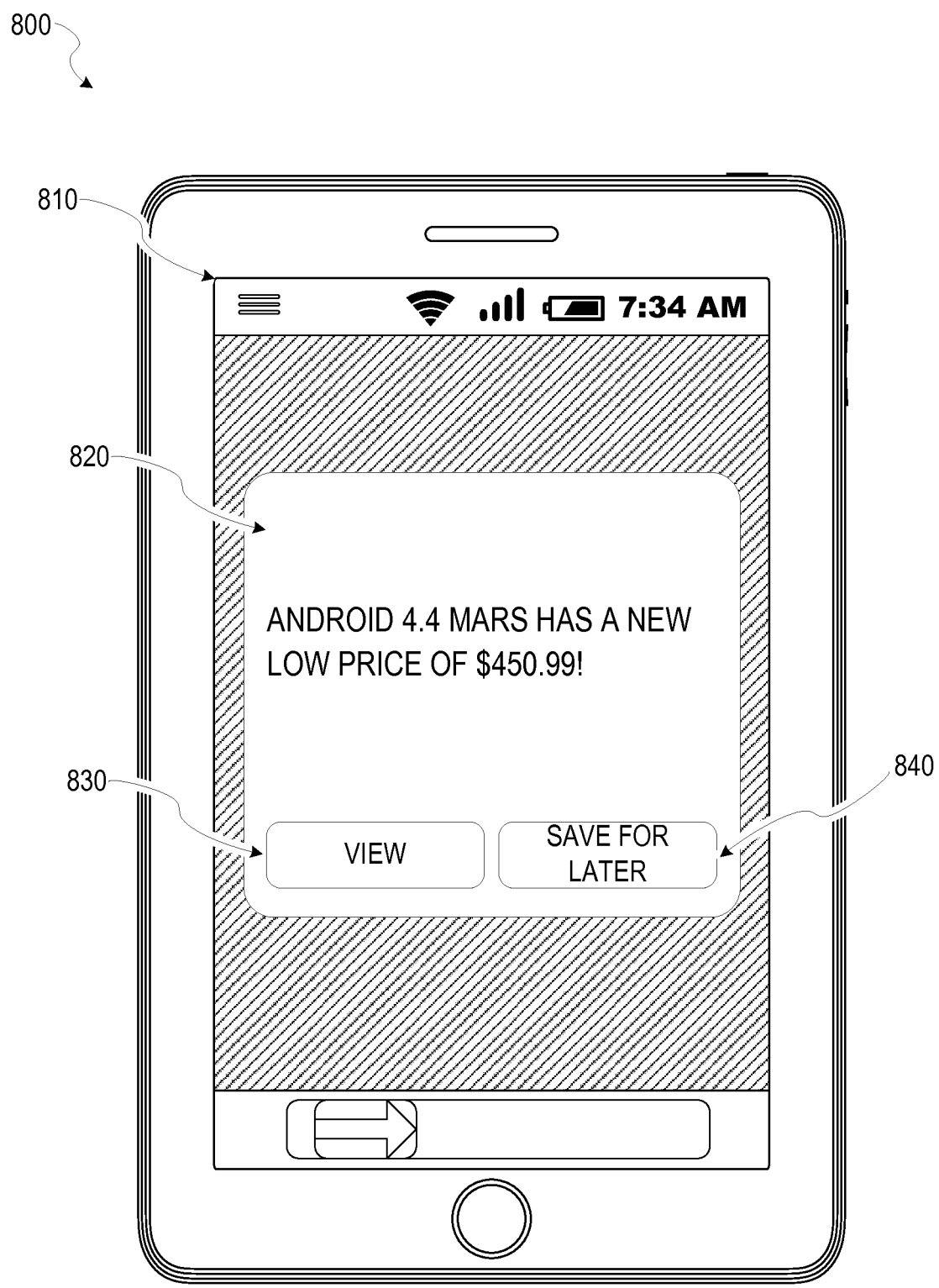
FIG. 8 depicts an example device displaying an example mobile user interface, according to example embodiments.

FIGS. 8-9 depict example user interfaces for interactively presenting information to the user. Although FIGS. 8-9 depict specific example user interfaces and user interface elements, these are merely non-limiting examples and many other alternate user interfaces and user interface elements can be generated by the presentation engine 210 and presented to the user. It will be noted that alternative presentations of the displays of FIGS. 8-9 include additional information, graphics, options, and so forth. Additionally, other presentations can include less information, or provide abridged information for easy use by the user.

FIG. 8 depicts an example mobile device 800 (e.g., smart phone) displaying an example user interface 810 that includes a short notification 820, according to some example embodiments. In various example embodiments, the presentation engine 210 causes presentation of the short notification 820 to the user. For instance, the presentation engine 210 communicates, to the device 800, instructions to present the short notification 820. In some instances, the instructions include message content, generated by the analysis engine 240 in response to the user selecting the selection 730 to be notified of relevant updates associated with the specific product. In example embodiments, the short notification 820 comprises a text message, such as SMS messages, MMS, or EMS. In other embodiments, the short notification 820 comprises a push notification or another similar type of notification. In further example embodiments, the short notification 820 comprises interactive user interface elements such as user interface elements 830 and 840. In these embodiments, the user interface elements 830 and 840 provide the user an option to make a selection (e.g., through an SMS system, mobile application, or web page). In this example, when the member clicks on interface elements 830, the mobile application launches and renders the content related to the short notification 820. In this particular case, the user is presented an Android 4.4 Mars listing that has a low price of $450.99, as indicated in the short notification 820.

FIG. 9 depicts an example mobile device 900 (e.g., a smart watch) displaying an example message notification 910, according to an example embodiment. In response to the user comparing a current phone the user owns with other phones in the market as illustrated in association with FIG. 6 and FIG. 7, the analysis engine 240 generates notifications associated with the user's phone. In this specific example, the average resale price of the user's phone has increased since the last session in which the user performed a comparison search. The purpose of the notification 910 is to keep the user informed of the status of their current phone and facilitate the resale of the current phone. In some implementations, the message notification 910 is interactive and when activated by the user, a posting to place the current phone on sale that corresponds to the message notification 910 is facilitated. Alternative interactive presentations of the message notification 910 may include additional information, graphics, media, options, and so on while other presentations include less information.

Engines, Components, and Logic

Certain embodiments are described herein as including logic or a number of components, engines, or mechanisms. Engines may constitute either software engines (e.g., code embodied on a machine-readable medium or in a transmission signal) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein. For instance, the hardware engines can operate to perform operations of the method 300, method 400, and other operations described in association with FIG. 3 and FIG. 4.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software encompassed within a general-purpose processor or other programmable processor. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software may accordingly configure a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Software Architecture

Figure 10:
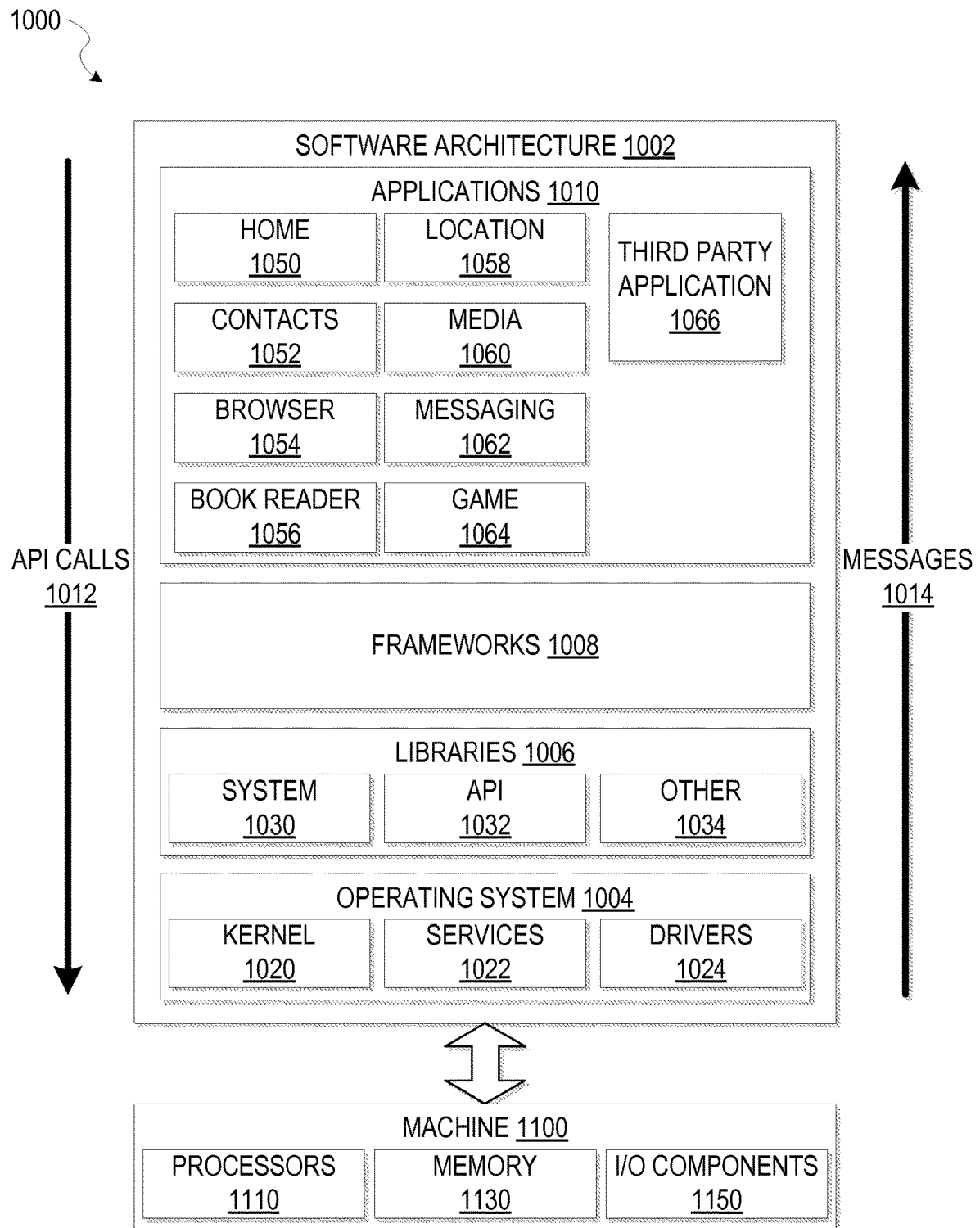
FIG. 10 is a block diagram illustrating an example of a software architecture that may be installed on a machine, according to some example embodiments.

FIG. 10 is a block diagram 1000 illustrating an architecture of software 1002, which may be installed on any one or more of the devices described above. FIG. 10 is merely a non-limiting example of a software architecture, and it will be appreciated that many other architectures may be implemented to facilitate the functionality described herein. The software 1002 may be implemented by hardware such as machine 1100 of FIG. 11 that includes processors 1110, memory 1130, and I/O components 1150. In this example architecture, the software 1002 may be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, according to some implementations.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers in some implementations. For example, the kernel 1020 provides memory management, processor management (e.g., scheduling), component management, networking, security settings, among other functionality. The services 1022 may provide other common services for the other software layers. The drivers 1024 may be responsible for controlling or interfacing with the underlying hardware. For instance, the drivers 1024 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1006 provide a low-level common infrastructure that may be utilized by the applications 1010. The libraries 1006 may include system 1030 libraries (e.g., C standard library) that may provide functions such as memory allocation functions, string manipulation functions, mathematic functions, and the like. In addition, the libraries 1006 may include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 may also include a wide variety of other libraries 1034 to provide many other APIs to the applications 1010.

The frameworks 1008 provide a high-level common infrastructure that may be utilized by the applications 1010, according to some implementations. For example, the frameworks 1008 provide various graphic user interface (GUI) functions, high-level resource management, high-level location services, and so forth. The frameworks 1008 may provide a broad spectrum of other APIs that may be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as third party application 1066. According to some embodiments, the applications 1010 are programs that execute functions defined in the programs. Various programming languages may be employed to create one or more of the applications 1010, structured in a variety of manners, such as object-orientated programming languages (e.g., Objective-C, Java, or C++) or procedural programming languages (e.g., C or assembly language). In a specific example, the third party application 1066 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1066 may invoke the API calls 1012 provided by the mobile operating system 1004 to facilitate functionality described herein.

Example Machine Architecture and Machine-Readable Medium

Figure 11:
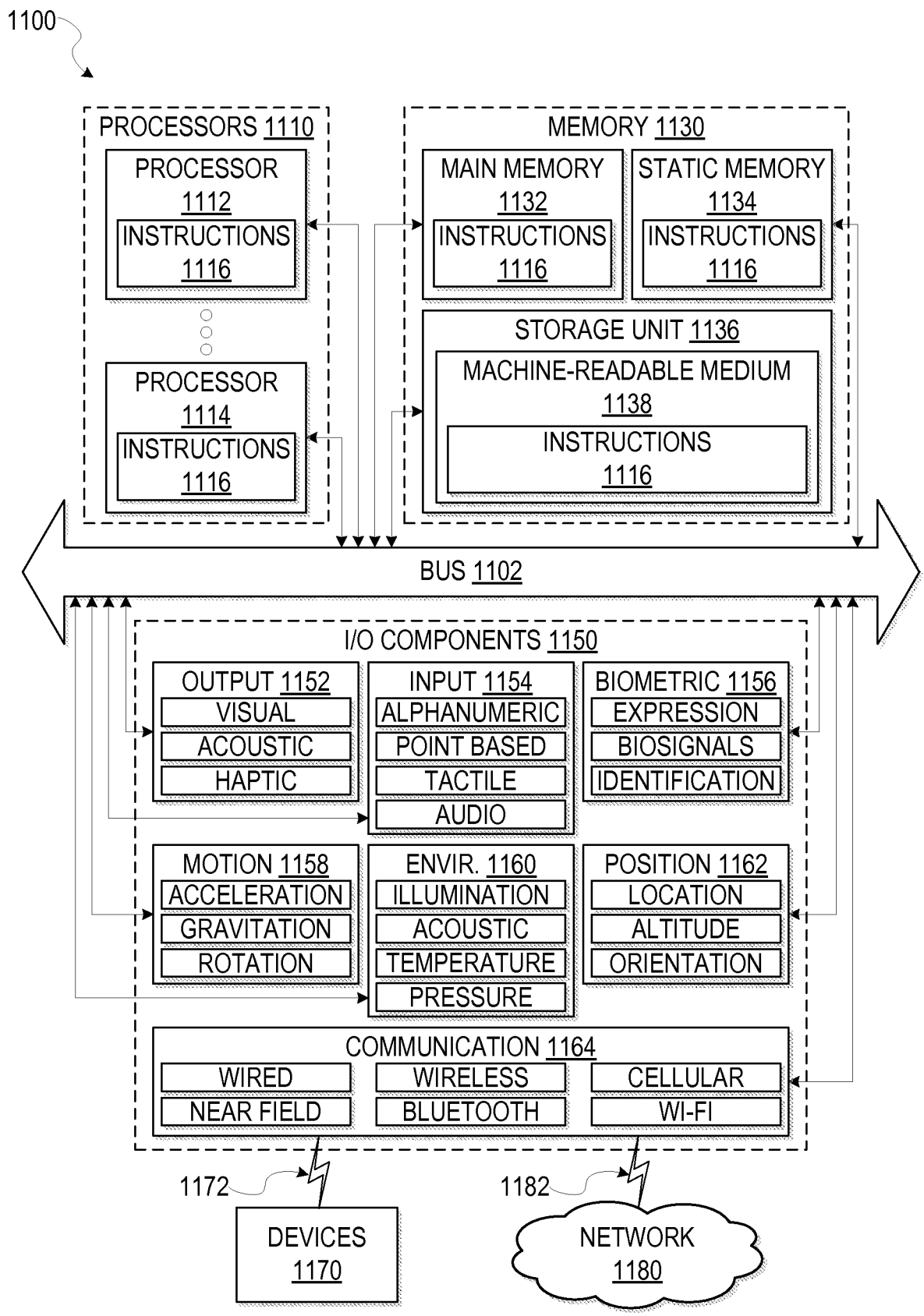
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For instance, the machine 1100 can perform the operations of method 300 and method 400. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment.

The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processors that may comprise two or more independent processors (also referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory 1130 may include a main memory 1132, a static memory 1134, and a storage unit 1136 accessible to the processors 1110 via the bus 1102. The storage unit 1136 may include a machine-readable medium 1138 on which is stored the instructions 1116 embodying any one or more of the methodologies or functions described herein. The instructions 1116 may also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various implementations, the main memory 1132, static memory 1134, and the processors 1110 are considered as machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162 among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 1162 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, in some implementations, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Furthermore, the machine-readable medium 1138 is non-transitory (in other words, not having any transitory signals) in that it does not embody a propagating signal. However, labeling the machine-readable medium 1138 as "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    generating an adjustable slider for presentation on a user interface displayed at a user device, the adjustable slider initially configured with a single reference value and comprising a visual reference point indicating the single reference value, the visual reference point positioned at a fixed position on the adjustable slider;
    receiving user input to adjust the single reference value of the adjustable slider via an adjustable element of the adjustable slider, the visual reference point remaining at the fixed position on the adjustable slider to enable a visual comparison between the adjusted value and the single reference value;
    in response to receiving the user input to adjust the single reference value, obtaining search results based on the adjusted value; and
    causing presentation of search results on the user interface displayed on the user device.

2. The computer-implemented method of claim 1, wherein the single reference value comprises a value of an attribute of an item.

3. The computer-implemented method of claim 2, wherein the causing presentation of the search results comprises causing presentation of a graph displaying the search results and including a data point corresponding to the value of the attribute of the item to enable comparison of the search results to the item.

4. The computer-implemented method of claim 3, wherein the search results displayed in the graph are grouped based on shared attributes.

5. The computer-implemented method of claim 1, wherein the search results comprise a list of items that match values including the adjusted value.

6. The computer-implemented method of claim 1, further comprising:
    receiving additional user input to adjust an additional reference value of at least one additional adjustable slider via an additional adjustable element of the additional adjustable slider;
    in response to receiving the additional user input, updating the search results to match values including the adjusted value and the adjusted additional value; and
    causing presentation of the updated search results on the user interface displayed on the user device.

7. The computer-implemented method of claim 1, further comprising:
    determining a geo-location of the user device; and
    refining the search results to include items available within a predefined distance to the geo-location of the user device.

8. A system comprising:
    one or more processors and a memory including instructions, which when executed by the one or more processors, cause the one or more processors to perform operations comprising:
    receiving a selection of an item from a user device;
    identifying attributes of the selected item and a value for each attribute of the selected item;
    generating adjustable sliders for presentation on a user interface displayed at the user device, each of the adjustable sliders initially configured with a value corresponding to the value of the respective attribute of the selected item and comprising a visual reference point indicating the respective values, each respective visual reference point positioned at a fixed position on the respective adjustable sliders;
    receiving user input to adjust a value of at least one of the adjustable sliders via an adjustable element of the adjustable slider;
    in response to receiving the user input to adjust the value, obtaining search results that match values indicated by the adjustable sliders including the adjusted value; and
    causing presentation of search results on the user interface displayed on the user device.

9. The system of claim 8, wherein the presented search results comprise a graph that includes a data point corresponding to the selected item to enable comparison of the search results to the selected item.

10. The system of claim 9, wherein the search results displayed in the graph are grouped based on shared attributes.

11. The system of claim 8, wherein the operations further comprise:
receiving additional user input to adjust an additional value of at least one additional adjustable slider via an additional adjustable element of the additional adjustable slider;
in response to receiving the additional user input, updating the search results to match values indicated by the adjustable sliders including the adjusted value and the adjusted additional value; and
causing presentation of the updated search results on the user interface displayed on the user device.

12. The system of claim 8, wherein at least one of the adjustable sliders includes a first adjustable element adjustable by a user to indicate a first value of an associated attribute and a second adjustable element adjustable by the user to indicate a second value of the associated attribute, the first value and the second value forming a range for the associated attribute.

13. The system of claim 8, wherein the operations further comprise:
determining a geo-location of the user device; and
refining the search results to include items available within a predefined distance to the geo-location of the user device.

14. A computing device comprising:
a display device; and
one or more processors and a memory including instructions, which when executed by the one or more processors, cause the one or more processors to perform operations comprising:
generating adjustable sliders for presentation on a user interface displayed on the display device of the computing device, at least one of the adjustable sliders initially configured with a reference value and comprising a visual reference point indicating the reference value, the visual reference point positioned at a fixed position on the adjustable slider;
receiving user input to adjust the reference value of the at least one adjustable slider via an adjustable element of the adjustable slider, the visual reference point remaining at the fixed position on the adjustable slider to enable a visual comparison between the adjusted value and the reference value;
in response to receiving the user input to adjust the reference value, obtaining search results that match values indicated by the adjustable sliders including the adjusted value; and
causing presentation of search results on the user interface displayed on the display device of the computing device.

15. The computing device of claim 14, wherein the reference value comprises a value of an attribute of an item.

16. The computing device of claim 15, wherein the search results are grouped based on shared attributes.

17. The computing device of claim 15, wherein the causing presentation of the search results comprises causing presentation of a graph displaying the search results and including a data point corresponding to the value of the attribute of the item to enable comparison of the search results to the item.

18. The computing device of claim 14, wherein the search results comprise a list of items that match values indicated by the adjustable sliders including the adjusted value.

19. The computing device of claim 14, wherein the operations further comprise:
receiving additional user input to adjust an additional reference value of at least one additional adjustable slider via an additional adjustable element of the additional adjustable slider;
in response to receiving the additional user input, updating the search results to match values indicated by the adjustable sliders including the adjusted value and the adjusted additional value; and
causing presentation of the updated search results on the user interface displayed on the display device of the computing device.

20. The computing device of claim 14, wherein the operations further comprise:
determining a geo-location of the computing device; and
refining the search results to include items available within a predefined distance to the geo-location of the computing device.

* * * * *